Patented Nov. 26, 1946

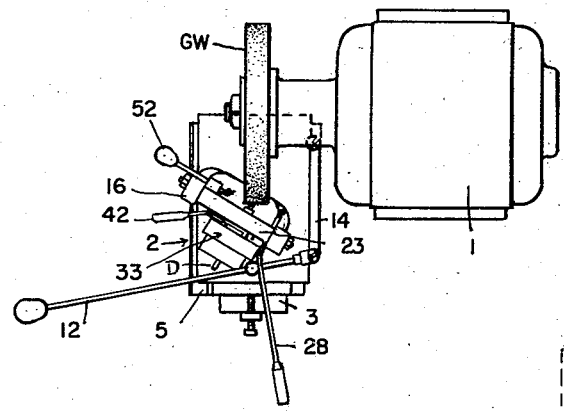
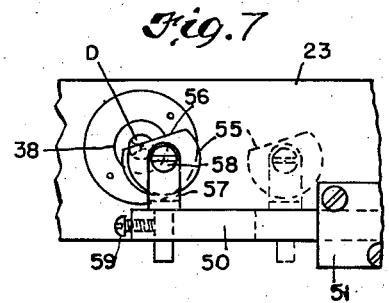
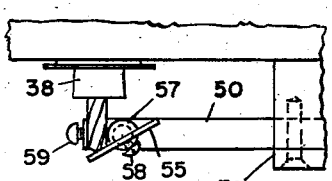
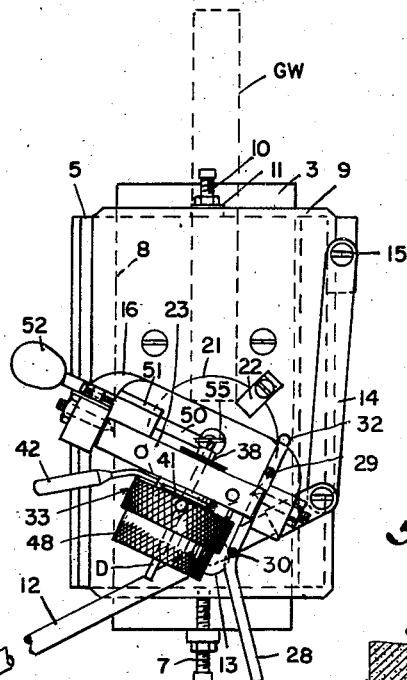
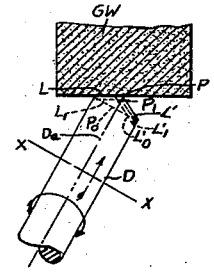
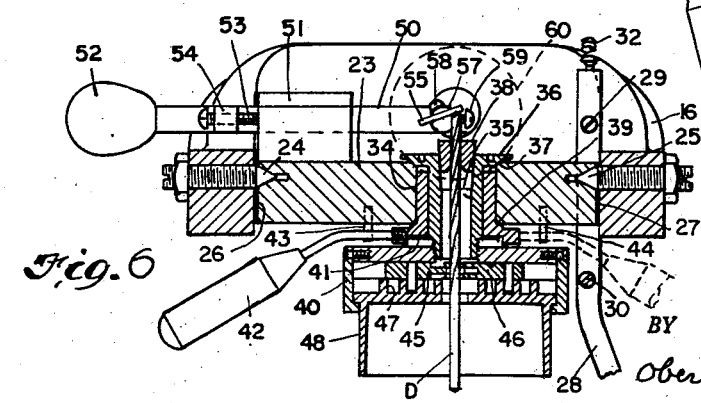
Nov. 26, 1946.   W. E. RANEY   2,411,591
DRILL GRINDER
Filed May 6, 1944   2 Sheets-Sheet 1
INVENTOR.
WILLIAM E. RANEY
BY
Oberlin, Limbach & Day
ATTORNEYS

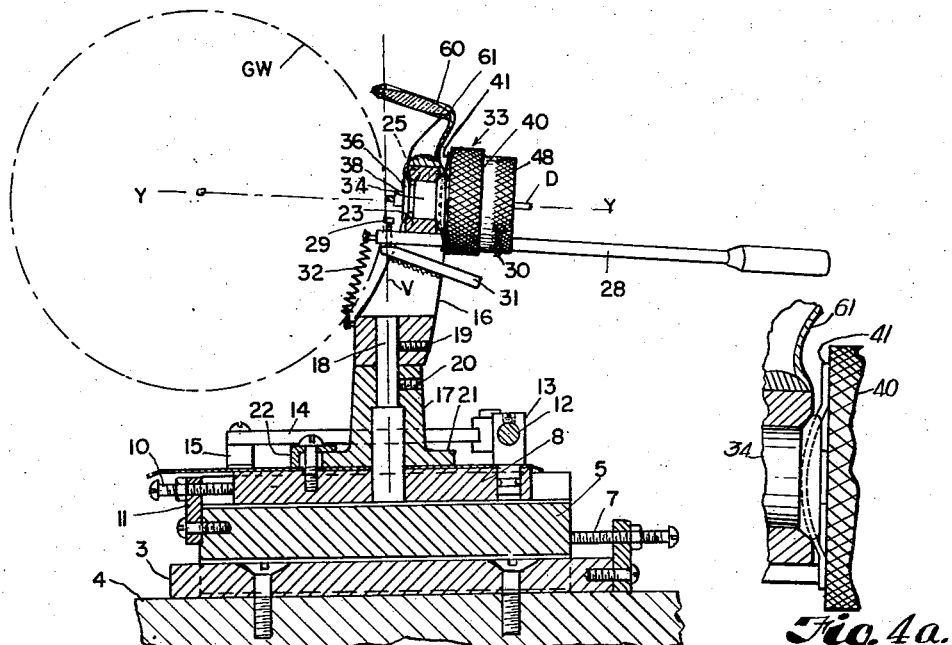
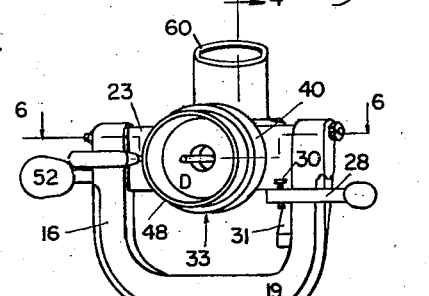
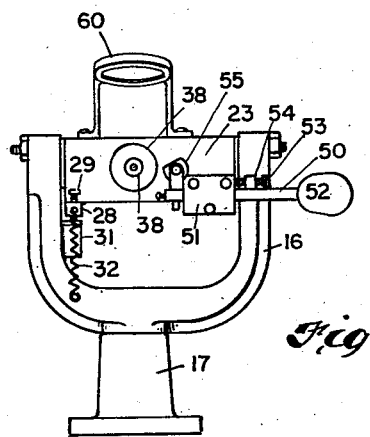
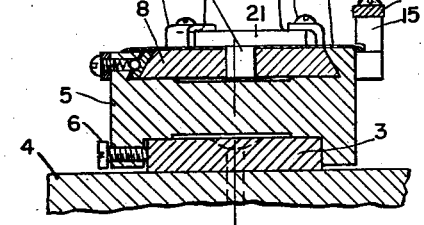
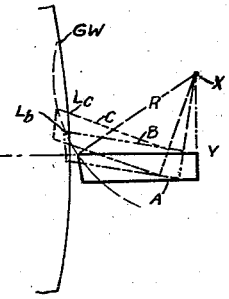

2,411,591

UNITED STATES PATENT OFFICE 2,411,591

DRILL GRINDER

William E. Raney, Shaker Heights, Ohio

Application May 6, 1944, Serial No. 534,450

14 Claims. (Cl. 51—219)

The present invention relates to a device for grinding twist drills and a novel grinding method inherent in the operation of such device. My invention is particularly applicable to the grinding of the points of twist drills of relatively small diameter, such as those in the drill diameter range of $15/64$ in. to No. 80 gauge, i. e., from .2343 inch to .0135 inch diameter.

In the drill grinding art, there are three requisites which must be satisfied if an accurate and satisfactory cutting edge is to be imparted to the drill point; and these are, (1) the formation of equal lip angles (viz., the angle of the lip or cutting edge with respect to the drill axis), (2) coincidence of the intersection of the drill point lips or cutting edges with the drill axis, and (3) the accurate determination and equalization of the lip cutting edge clearances or back-off. Inasmuch as the infeed of the drill with respect to the grinding wheel or abrading surface is a basic factor in determining not only the lip angles but also the lip clearances, I provide means for insuring an equal and precise amount of infeed during the grinding of each lip of the drill.

My invention also provides a novel and reliable means for initially gripping the drill to be ground and aligning its lip or cutting edge with a fixed reference line, whereby the grinding of all of the lips on the drill point is effected from the same point of reference; such aligning means involving an optical gauging device, rather than a mere physical abutment of the drill with a gauge pin or the like, whereby any likelihood of error, due to the relatively easy flexing of the drill shank, particularly in the case of the smaller sized drills, is eliminated.

The device embodying the principle of my invention insures a high degree of accuracy in that the major and essential parts of the device which holds the drill and imparts the necessary motion to it for the grinding operation are so mounted as to move about predetermined centers or axes. All of these centers or axes, in the construction of my drill grinding device, are given a definite and fixed location with respect to the above-mentioned fixed reference line, so that subsequent operations all have a definite relation to the initial starting point from such fixed reference line.

Another object of my invention is to provide an improved form of drill holding chuck, whereby the drill is accurately held close to the point to be ground, thus minimizing errors due to bending or distortion, and in which the gripping action of the chuck itself is not likely to produce any distorting, cocking or damaging action upon the drill. Such chuck also includes an efficient, accurate and easily manipulated means for rotating it through a predetermined angle, (e. g. 180° in the case of a two-flute twist drill) to locate succeeding drill point lips in the proper position for grinding.

Another object of my invention is to provide a method for controlling both the amount of infeed of the drill point with respect to the grinding wheel and the angle of lip clearance on the drill point. Briefly outlined, I accomplish this objective by rotating the drill point through a predetermined arc of rotation, the angle or the extent of such arc being positively equal when grinding two or more of the drill lips. Thus, any errors incident to feed movement control which are dependent upon human manipulation of feed screws, cams and indicator gauge readings are entirely obviated by virtue of my invention.

Additional objects and advantages of the invention shall become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a top plan view showing the drill grinding device embodying the principle of my invention in operative position with respect to a grinding wheel;

Fig. 2 is an enlarged, top plan view of the drill grinding device alone;

Fig. 3 is an elevational view, partially in section, of the drill grinding device and taken from its outer side, i. e. on the side occupied by the operator and away from the grinding wheel;

Fig. 4 is a vertical, sectional view taken upon a plane normal to Fig. 3 and substantially along line 4—4 thereof;

Figure 4a is an enlarged view of a portion of Figure 4 showing the spring 41;

Fig. 5 is a side elevational view of the device (with the slide base omitted) and taken from the side opposite to that of Fig. 3;

Fig. 6 is a substantially horizontal, sectional view taken along line 6—6 of Fig. 3;

Fig. 7 is an enlarged, side elevational view showing the detail of the drill point indexing and gauging device;

Fig. 8 is a top plan view of Fig. 7;

Fig. 9 is a diagrammatic view illustrating the infeed and axial rotational movements of the drill with respect to the grinding wheel surface; and Fig. 10 is a diagrammatic view illustrating the arcuate traverse of a given plane section of the drill with respect to the grinding wheel and illustrating the manner in which both the amount of infeed and amount of lip clearance are determined and controlled.

Now referring more particularly to Figs. 1-6 inclusive of the drawings, there are shown therein a grinding wheel GW mounted upon the spindle of a drive motor 1 and the drill holding device or drill grinder of my invention as indicated generally at 2. A base plate 3 is affixed to the top (indicated at 4) of the table or workbench upon which both the motor 1 and drill grinder 2 are supported. A base block 5 has a bottom channel fitting over the base plate 3, with one or more set screws, such as indicated at 6, and an adjusting screw 7 for preliminarily locating the drill grinder 2 with respect to the grinding wheel GW. The upper face of the base block 5 contains a dovetail slideway in which the slide base 8 is received. A cover plate 9 extends over the top of the slide base 8 for the purpose of keeping out grit and grindings from the slide surfaces. An adjustable locking screw 10 is mounted in the vertical plate 11 on the end of the base block 5 and bears against the left-hand or inner end of the slide base 8, thus providing an abutment determining the left-hand movement of the slide base 8, i. e. the movement of the latter in a direction toward the grinding wheel GW.

An operating lever 12 is pivotally mounted on the top of the slide base 8 as indicated at 13 and also connected through the link 14 to the pivot pin 15 which is in turn fixedly attached to the base block 5.

The trunnion supporting frame or yoke 16 is rigidly secured, in common with the stanchion 17, to the vertical shaft 18 by means of the set screws 19 and 20. The lower end of the shaft 18 fits within the slide base 8 and is rotatable with respect thereto. The bottom flange 21 on the stanchion 17 is gripped by the clamping screws and dogs as indicated at 22, for holding the stanchion 17 and the yoke 16 in the desired angular position with respect to the axis of the shaft 18.

The trunnion bar 23 extends between the vertical arms of the supporting member or yoke 16 and is mounted therein upon the aligned centering points 24 and 25. Compressible shims 26 and 27 are located between the ends of the bar 23 and the inner faces of the arms of the yoke 16, for aiding in the correct centering of the bar 23 upon the fixed center points 24 and 25. The bar 23 is rotatable or rockable upon the center points 24 and 25 by means of the operating lever 28 attached to the underside of the bar 23. Contact screws 29 and 30 are threadably mounted in the lever 28 and are adapted to bear against the abutment bar 31 which is fixed against the side of one of the arms of the yoke 16. A tension spring 32 normally urges the bar 23 to the position shown in Fig. 4 and where the end of the screw 29 is in contact with the abutment bar 31.

The drill gripping chuck, indicated generally at 33, is mounted in the trunnion bar 23 with its axis perpendicular to the axis of the latter and laterally spaced or offset below it. This is indicated by the relationship of the axial center line YY and the center point 25 in Fig. 4. The details of construction of the drill chuck 33 are best shown in Fig. 6. An outer sleeve 34 rotatably fits within a bore in the cross bar 23. An inner sleeve 35 fits within the sleeve 34 and has an outer flange 36 which has a tapered or conical surface bearing seat as indicated at 37 on the face of the cross bar 23. A drill holding bushing 38 has an inner cylindrical bore equal to the outer diameter of the drill D which is to be ground, and an outer tapered cylindrical surface adapted to fit within a tapered bore in the end of the sleeve 35.

A tapered or conical bearing surface 39 is also located adjacent the outer flange of the outer sleeve 34 and engages with a complementary bearing seat in the outside face of the trunnion bar 23. A chuck jaw housing 40 is mounted on the outer end of the inner sleeve 35. An elliptical leaf spring 41 is non-rotatably locked in a slot in the outer face of the flange on the sleeve 34 and mounted between the inner face of the housing 40 and the outer end of the outer sleeve 34, thus placing the sleeves 34 and 35 under a tension which draws them towards each other and insures the proper seating and centering of such sleeves upon their respective bearing surfaces 39 and 37. In this manner the alignment of the drill chuck 33 upon a fixed axis with respect to the trunnion bar 23 is accurately maintained. The spring 41 also serves as a friction detent tending to lock the chuck jaw housing 40 in rotative movement with the sleeves 34 and 35.

An operating handle and lever 42 is attached to the outer sleeve 34 and adapted to bear against the abutment pins 43 and 44 projecting from the outer face of the trunnion bar 23.

A pair of chuck jaws 45 and 46, the jaw 46 being bifurcated and adapted to receive the single end of the jaw 45 within such bifurcations, are connected by means of transverse pins to the scroll 47 on the inner face of the cylindrical, knurled nob 48.

A bar 50, of rectangular or square cross-section, is slidably mounted in the enclosed guide housing 51 on the inner face of the trunnion bar 23. An operating nob 52 is mounted on the outer end of the bar 50 for moving the latter into and out of a position in alignment with the point of the drill D. A set screw 53 is carried in the projecting lug 54 on the bar 50 and adapted to bear against the side of the housing 51 for determining the extent of inward movement of the bar 50. A disc 55, having a straight edge portion 56, is adjustably mounted between the prongs of the bifurcated pin 57, by means of the adjusting screw 58. A set screw 59 bears against the lower cylindrical end of the pin 57 for holding the latter at the desired position of rotative adjustment in the end of the bar 50.

A magnifying glass 60, carried in the frame 61 attached to the top side of the trunnion bar 23, is focused upon the point of the drill D, as best illustrated in Figs. 4 and 6.

The operation of the above-described device is as follows:

The lever 12 is pulled outwardly or toward the operator and away from the grinding wheel GW. The drill D is then inserted in the chuck 33 and its lip aligned with the straight edge 56, and with lever 42 abutting pin 43, the drill is then clamped by the chuck jaws 45 and 46. In the meantime, the stanchion 17 and the yoke 16 have been set at the desired angle about the axis of the vertical shaft 18, which corresponds to the angle of the drill point to be ground. The bar 50 is then moved to a retracted position, as represented by the dotted lines in Fig. 7. The lever 12 is then pushed inwardly until the slide base 8 contacts with the end of the adjusting screw 10. The lever 28 is then depressed until the screw 30 contacts with the abutment bar 31, thus grinding one lip of the drill. The lever 12 is pulled outwardly again and the lever 42 rotated in a clockwise direction until it contacts with the stop pin 44, thus shifting the drill 180° (in the case of a two-flute twist drill), about its axis, and presenting the second lip for grinding.

The lever 12 is then pushed in to its full permissible extent and the lever 28 depressed, thus grinding the other lip of the drill point.

It will be noted that the vertical axis V of the shaft 18 intersects the point of the drill D when the latter is in its properly aligned position with the gauge 56, as illustrated in Fig. 4. Hence, as the stanchion 17 and the yoke 16 are pivotally moved about the shaft 18 to determine the lip angle to be ground, the drill point necessarily remains in one and the same position. This is further illustrated in Fig. 9 where the drill point P is the point of reference about which the axis of the drill $D_a$ pivots when the yoke 16 is set at its predetermined angle. The line XX in Fig. 9 represents the axial center line of the trunnion bar 23, and hence the axis about which the point P and lip L of the drill are traversed during the grinding operation. The dotted line $L_1$ in Fig. 9 represents the depth of grinding cut or amount of metal that is removed from the cutting edge of the drill lip during a single infeed movement. This depth of cut must be precisely equal to the depth of the grinding cut taken off the lip L' when the drill is rotated about its axis $D_a$ and then fed into the grinding wheel GW for grinding the other lip. As long as the infeed of the drill during these two grinding operations is positively equal, the two lips $L_1$ and $L'_1$ will likewise be equal and the new point $P_1$ of the drill will coincide with the drill axis $D_a$. The dotted line $L'_0$ in Fig. 9 illustrates the error which might otherwise be encountered, if such drill infeed (represented by the dotted line arrow) was not so accurately controlled and determined.

Fig. 10 diagrammatically illustrates the manner in which both the infeed of the drill and the angle of lip clearance is determined in the method of operation inherent in the above-described drill grinder of my invention. The point X in Fig. 10 represents the axial center line of the fixed centers 24 and 25 about which the trunnion bar 23 is rotated. The solid line shape A represents a plane section taken through the drill at a given point parallel to its axis. In the normal position of the drill shown, its axis YY passes through the center O of the grinding wheel GW (see Fig. 4). Now directing attention back to Fig. 10, as the given, parallel axial section A of the drill is traversed about the center X, its lip L travels through the arc described by the radius R. The dotted line positions B and C represent subsequent angular positions occupied by the drill in its traverse about the center X. At the position B, the lip clearance angle will be approximately 8°, as indicated at $L_b$, and at the position C the lip clearance angle will be approximately 16° as indicated at $L_c$. Thus, the angle of traverse of the drill about the center X determines not only the angle of lip clearance, which is represented by the stopping point of the drill in such traverse, but also determines the amount of infeed. In Fig. 10, the dotted line portions to the left of the grinding wheel arc GW represent the amount of ground off or removed metal from the end of the drill. Variation in the extent of such arc or angle of traverse of the drill about the center X, and accordingly variation in the lip clearance angle and in the amount of infeed, are, of course, controlled by adjustment of the screws 29 and 30.

It will thus be seen that the arc of traverse for each lip drill grinding operation, starting and stopping at exactly the same point in each case, insures positively equal sized lips and equal lip clearance angles on the ground drill point.

Other modes of applying the principle of the invention may be employed, change being made as regards the details described, provided the features stated in any of the following claims or the equivalent of such be employed.

I therefore particularly point out and distinctly claim as my invention:

1. A drill grinder comprising a rotatable member mounted between fixed center points, a drill chuck carried by said rotatable member with the axis of said chuck being perpendicular to and offset from the axis of said rotatable member, means for rotating said rotatable member, a supporting member carrying said fixed center points and pivotally mounted on an axis perpendicular to the axes of both said chuck and of said rotatable member and intersecting the point of the drill gripped in said chuck when said rotatable member is in normal position.

2. A drill grinder comprising a rotatable member mounted between fixed center points, a drill chuck carried by said rotatable member with the axis of said chuck being perpendicular to and offset from the axis of said rotatable member, said chuck including a removable bushing adjacent its forward end and adapted to hold the drill close to the drill point, and chuck jaws adjacent its rear end adapted to grip the drill shank.

3. A drill grinder comprising a rotatable member mounted between fixed center points, a drill chuck rotatably mounted in said rotatable member with the axis of said chuck being perpendicular to and offset from the axis of said rotatable member, means for rotating said chuck about its axis through a predetermined angle, said chuck including a removable bushing adjacent its forward end adapted to hold the drill close to the drill point and chuck jaws adjacent its rear end adapted to grip the drill shank, means for rotating said rotatable member, and means for bodily moving said rotatable member in a plane substantially parallel to the axes of said rotatable member and of said chuck when the latter is in its normal position.

4. A drill grinder comprising a rotatable member, means for rotating said rotatable member through a predetermined arc, a drill chuck mounted transversely of the axis of said rotatable member, said chuck including a pair of interfitting sleeves having flanges contacting with opposite sides of said rotatable member, and spring means connected between said sleeves for urging the latter toward each other and for holding said flanges in contact with said sides of said rotatable member.

5. A drill grinder comprising a flat sided bar rotatably mounted between fixed center points, a drill chuck mounted in said bar with its axis normal to that of said center points, said drill chuck including a pair of telescopically fitting sleeves, each of said sleeves having a terminal flange overlying one side of said bar, respectively, conical bearing seats for said flanges on the sides of said bar, a chuck jaw housing attached to the unflanged end of one of said sleeves, and a leaf spring mounted between the flange of the other of said sleeves and the radial face of said housing, said spring urging said flange and said housing away from each other.

6. A drill grinder comprising a rotatable member mounted between supports at each end, a drill chuck mounted in said member and having a sleeve with a tapered flange, a tapered bearing seat in said rotatable member to receive the tapered flange, the axis of said chuck being perpendicular to and offset from the axis line of said rotatable member between its end supports, a lever for rotating said rotatable member through a desired arc, and a gauge movable along said rotatable member into and out of a position aligning with the point of a drill gripped in said chuck.

7. A drill grinder comprising a trunnion member having fixed center points, said trunnion member being pivotally adjustable about an axis normal to that of said fixed centers, a rotatable member mounted between said fixed centers, a drill chuck mounted in said rotatable member and having a sleeve with a tapered flange, a tapered bearing seat in said rotatable member to receive the tapered flange, and a lever for rotating said rotatable member through a desired arc.

8. A drill grinder comprising a rotatable member mounted between fixed center points, a drill chuck carried by said rotatable member with the axis of said chuck being perpendicular to and offset from the axis of said rotatable member, a gauge bar movable parallel to the axis of said rotatable member and into and out of a position in alignment with the point of a drill gripped in said chuck, a magnifying glass mounted on said rotatable member and focused on such drill point, means for rotating said rotatable member, and means for bodily moving said rotatable member in a plane substantially parallel to the axes of said rotatable member and of said chuck when the latter is in its normal position.

9. A drill grinder comprising a rotatable member mounted between fixed center points, a drill chuck carried by said rotatable member with the axis of said chuck being perpendicular to and offset from the axis of said rotatable member, a gauge bar movable parallel to the axis of said rotatable member and into and out of a position in alignment with the point of a drill gripped in said chuck, a supporting member carrying said fixed center points and pivotally mounted on an axis perpendicular to the axes of both said chuck and of said rotatable member, the pivotal axis of said supporting member intersecting the edge of said gauge bar when said rotatable member is in normal position.

10. A drill grinder comprising a trunnion member having fixed center points, said trunnion member being pivotally adjustable about an axis normal to that of said fixed centers, a rotatable member mounted between said fixed centers, a drill chuck carried by said rotatable member with the axis of said chuck being perpendicular to and offset from the axis of said rotatable member, a slide supporting said trunnion member and movable in a plane substantially parallel to the axes of said rotatable member and of said chuck when the latter is in its normal position, an adjustable abutment for limiting the movement of said slide, an abutment on said trunnion adapted to be contacted by said rotatable member for determining the limit of the rotative movement of the latter, and spring means urging said rotatable member against said last-named abutment.

11. A drill grinder comprising a trunnion member having fixed center points, said trunnion member being pivotally adjustable about an axis normal to that of said fixed centers, a rotatable member mounted between said fixed centers, a drill chuck carried by said rotatable member with the axis of said chuck being perpendicular to and offset from the axis of said rotatable member, a gauge bar movable parallel to the axis of said rotatable member and into and out of a position in alignment with the point of a drill gripped in said chuck, a magnifying glass mounted on said rotatable member and focused on such drill point, a slide supporting said trunnion member and movable in a plane substantially parallel to the axes of said rotatable member and of said chuck when the latter is in its normal position, an adjustable abutment for limiting the movement of said slide, an abutment on said trunnion adapted to be contacted by said rotatable member for determining the limit of the rotative movement of the latter, and spring means urging said rotatable member against said last-named abutment.

12. A drill grinder comprising a trunnion member having fixed center points, said trunnion member being pivotally adjustable about an axis normal to that of said fixed centers, a rotatable member mounted between said fixed centers, a drill chuck carried by said rotatable member with the axis of said chuck being perpendicular to and offset from the axis of said rotatable member, a gauge bar movable parallel to the axis of said rotatable member and into and out of a position in alignment with the point of a drill gripped in said chuck, a magnifying glass mounted on said rotatable member and focused on such drill point, the first-named pivotal axis of said trunnion member intersecting such drill point when the latter is in contact with said gauge bar, a slide supporting said trunnion member and movable in a plane substantially parallel to the axes of said rotatable member and of said chuck when the latter is in its normal position, an adjustable abutment for limiting the movement of said slide, an abutment on said trunnion adapted to be contacted by said rotatable member for determining the limit of the rotative movement of the latter, and spring means urging said rotatable member against said last-named abutment.

13. A drill grinder comprising a trunnion member having fixed center points, said trunnion member being pivotally adjustable about an axis normal to that of said fixed center points, a rotatable member mounted between said fixed center points, a drill chuck rotatably mounted in said rotatable member with the axis of said chuck being perpendicular to and offset with the axis of said rotatable member, said chuck including a removable bushing adjacent its forward end adapted to hold the drill close to the drill point and chuck jaws adjacent its rear end adapted to grip the drill shank, means for rotating said chuck about its axis through a predetermined angle, an abutment adapted to be contacted by said rotatable member for determining the limit of its rotative movement, spring means urging said rotatable member against said abutment, a gauge bar movable parallel to the axis of said rotatable member and into and out of a position in alignment with the point of a drill gripped in said chuck, a magnifying glass mounted on said rotatable member and focused on said drill point, a slide supporting said rotatable member and movable in a plane substantially parallel to the axes of said rotatable member and of said chuck when the latter is in its normal position, and an adjustable abutment for limiting the movement of said slide.

14. A drill grinder comprising a member rotatably mounted between supports at each end and above its center line, a drill chuck rotatably mounted in said member with the axis of said chuck perpendicular to and offset below the axis of mounting of said rotatable member and having telescoping sleeves each with a terminal flange having a tapered surface, and a tapered bearing seat on opposite sides of said rotatable member to receive said flanges.

WILLIAM E. RANEY.